United States Patent [19]

Guim

[11] Patent Number: 4,701,688
[45] Date of Patent: Oct. 20, 1987

[54] SAFETY BOOSTER CABLES WITH TIME DELAY

[76] Inventor: Raul Guim, 834 Venetia, Coral Gables, Fla. 33134

[21] Appl. No.: 836,069

[22] Filed: Mar. 4, 1986

Related U.S. Application Data

[63] Continuation-in-part of Ser. No. 609,030, May 10, 1984, Pat. No. 4,607,209.

[51] Int. Cl.[4] .............................................. H02J 7/00
[52] U.S. Cl. ........................................ 320/25; 320/31; 307/10 BP
[58] Field of Search ................... 320/2, 25, 26, 31, 47; 339/29 B; 307/10 R, 10 BP

[56] References Cited

U.S. PATENT DOCUMENTS

| | | | |
|---|---|---|---|
| 3,809,993 | 5/1974 | Wheeler | 320/25 |
| 4,163,134 | 7/1979 | Budrose | 320/47 X |
| 4,233,552 | 11/1980 | Baumbach | 320/25 X |
| 4,349,774 | 9/1982 | Farque | 320/25 |
| 4,463,402 | 7/1984 | Cottrell | 320/25 X |

Primary Examiner—Robert Hickey
Attorney, Agent, or Firm—Jesus Sanchelima

[57] ABSTRACT

A safety booster cable assembly for connecting a d.c. source to a receiving battery including a normally open relay interrupting the electrical connection between one of the two pairs of electrodes. Circuitry is provided for closing the contact of the relay when the electrodes being connected are of similar polarities. Time delay circuitry is included so that the relay contact is closed after a certain predetermined amount of time has passed so that sparks are prevented from the movement or scratching of the cable clips on the electrodes. Light emitting diodes are connected between the electrodes of the D.C. source and receiving battery so that they illuminate when the correct polarity is observed in the connection of the cable clips.

10 Claims, 2 Drawing Figures

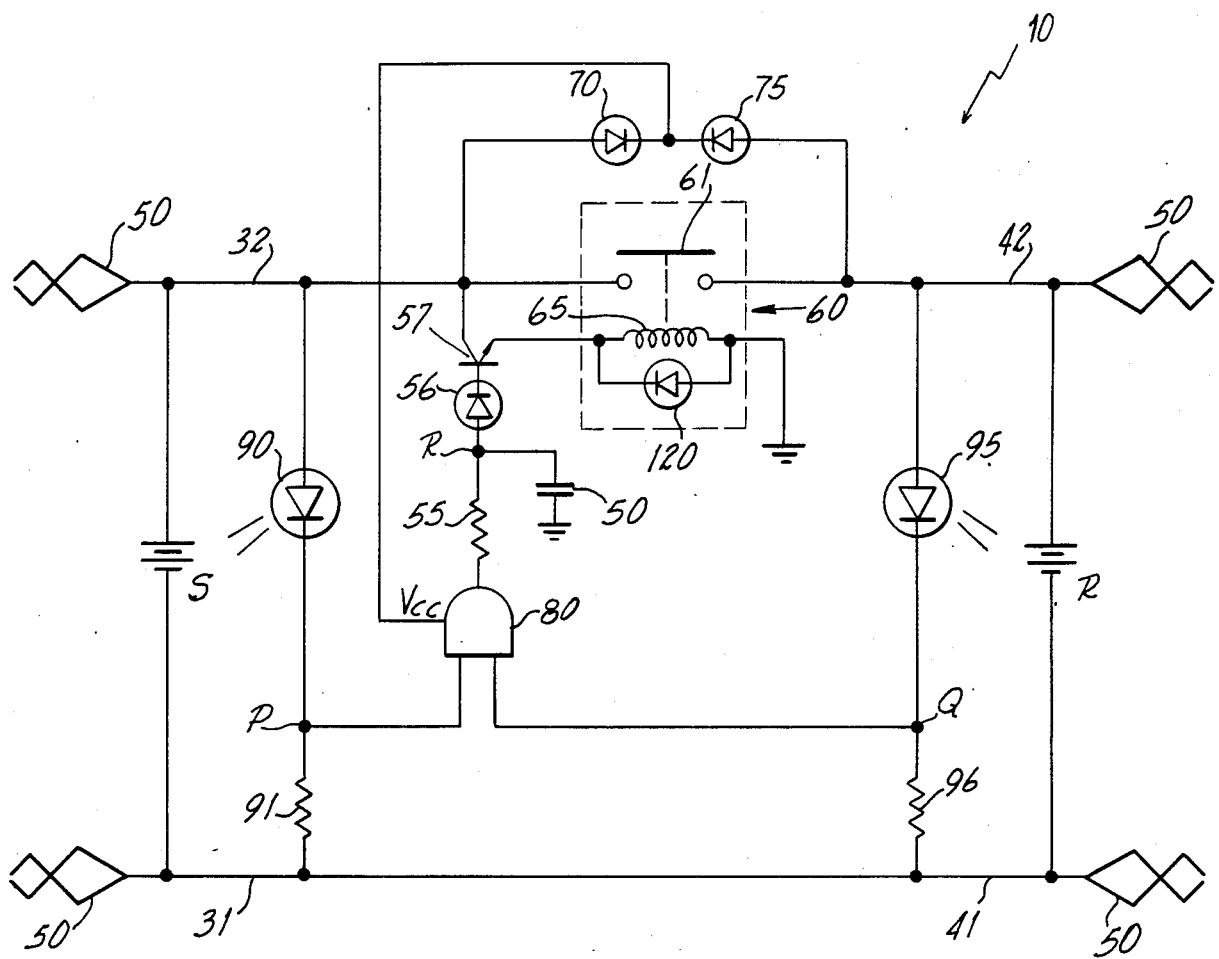
Fig-1-
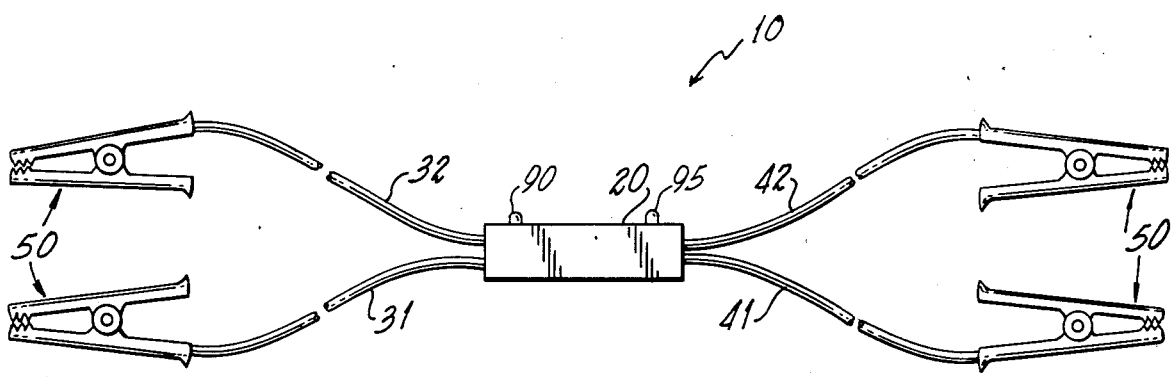
Fig-2-

SAFETY BOOSTER CABLES WITH TIME DELAY

BACKGROUND OF THE INVENTION

1. Other Related Applications

The present invention is a continuation-in-part of pending U.S. application Ser. No. 609,030, filed on May 10, 1984, now U.S. Pat. No. 4,607,209, which is hereby incorporated by reference.

2. Field of the Invention

This invention relates to safety booster cables that only operate when the correct polarity connection is achieved, and more particularly, to such cables that include a time delay after making the physical connection for the electrical connection to be operative.

3. Description of the Related Art

In the above referenced patent application, a booster cable is disclosed that operates only when the correct polarity connection is observed in the connection of the electrodes of a D.C. source (a battery or generator) to a receiving battery. However, it had the inherent inconvenience of generating sparks usually during the first few moments when making the initial connection. This happens because the user needs some time to make a solid physical connection with the alligator clips. There are some applications where this inconvenience may become a fatal problem, namely, with flammable atmospheres. The present invention solves the problem by providing a time delay to the operation of the safety booster cables claimed in the above referenced parent application.

SUMMARY OF THE INVENTION

It is the main object of the present invention to provide safety booster cables that wait a reasonable amount of time after making the initial physical connection before becoming electrically operative.

It is yet another object of the present invention to provide such a device that is inexpensive to manufacture and maintain while retaining its effectiveness.

Further objects of the invention will be brought out in the following part of the specification, wherein detailed description if for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 is a schematic diagram representing the safety booster cables with the time delay circuit utilzed in the preferred embodiment.

FIG. 2 is a representation of the safety booster cables with the circuit shown in FIG. 1 contained inside a protective box.

DETAILED DESCRIPTION OF THE PREFERRED EMBODIMENT

Referring now to FIGS. 1 and 2, where the present invention is generally referred to with numeral 10, it can be seen that the safety booster cable assembly 10 includes negative cable members 31 and 41 that are electrically connected together and typically to ground. Two positive cable members, 32 and 42, are electrically connected together through the normally open contact 61 of relay 60.

Cable members 31; 32; 41 and 42 are terminated with conventional alligator clips 50 at their ends. As in any other conventional booster cable pair, like electrodes are connected to each other. For the purposes of explaining its operation, cable member 32 is connected to the positive electrode of the D.C. source (a battery or D.C. generator) providing the electricity and cable member 42 is connected to the positive end of the battery receiving the electricity. As pointed out above, the connection between cable members 32 and 42 is interrupted by normally open relay contact 61. The negative electrodes of the source and receiving battery are connected together directly, and usually to ground. In a conventional booster cable pair, and even in the cable pair disclosed and claimed in the above referenced parent application, the user tries to achieve a solid physical connection or engagement to the respective electrodes. However, the creation of sparks is commonplace with the associated risk of igniting fuel vapors that may be present. This is specially true in remote areas inside a boat. With the present invention, this risk is eliminated because the present improved booster cable does not close contact 61 until after sufficient time has elapsed from the time of first physical contact of the last alligator clip 50 connection to its corresponding electrode. The following paragraphs describe the operation of the preferred embodiment.

Two branches of one diode and one resistor in series are connected between the electrodes of the source and battery, respectively. Diode 90 in series with resistor 91 provide a positive (logic high) voltage at P when a positive (correct) voltage is presented to the clip 50 of cable member 32. If the source's polarity is inverted, a negative voltage would be blocked by diode 90 and point P would be grounded (logic low). Diode 95 and resistor 96 work in a similar fashion with the receiving battery side and Q will sit at a positive (high) voltage only when cable member 42 is connected to the positive voltage of the receiving battery. This, of course, presupposes that the battery is not completely dead. Points P and Q are connected to the inputs of AND gate 80 which will produce a logic high when both, P and Q, are connected to the proper positive electrodes through diodes 90 and 95, respectively. Gate 80 is disabled or enabled depending on whether or not its supply voltage (Vcc) is applied. Vcc is only applied to gate 80 when either one of the two positive electrodes is connected to either cable member 32 or 42. Diodes 90 and 95 are light emitting diodes in the preferred embodiment to denote correct polarity connection.

A protection circuit is provided through back to back diodes 70 and 75. This protection circuit protects gate 80 from an inadvertent connection of either cable member 32 or 42 to the wrong polarity (negative) that would damage it. The back to back connection point is used to provide the supply voltage to gate 80.

Then, after both P and Q produce a high at the output of gate 80, capacitor 50 starts charging through resistor 55. The time constant of capacitor 50 and resistor 55 will determine how long it will take to reach a voltage $V_R$ at point R once the output of gate 80 is pulled up to a logic high. To activate relay coil 65 which in turn would close contact 61, a minimum treshold voltage $V_R$ is required. In the preferred embodiment, $V_R$ needs to be above 1.4 volts, approximately, which corresponds to the voltage drop across diode 56 and the voltage drop across the base/emitter junction NPN transistor 57. When this treshold voltage is reached, transistor 57 is turned on, activating coil 65. Of course, diode 56 and transistor 57 may be replaced with any other devices, such as inverter buffer, gate, comparator latch or equivalent that switches on when a predetermined $V_R$ voltage is reached. In the preferred embodiment, capacitor 50 and resistor 55 are chosen so that it takes about 6 seconds to reach a $V_R$ of 1.4 volts with batteries of 12 volts. In 6 seconds, the user has had ample time to make a solid physical connection and after this is accomplished, there is no reason for any sparks to occur.

A protection diode 120 is utilized to protect the circuitry against any back e.m.f. (electro motive force) voltage produced by relay coil 65. Coil 65 is connected to ground on one end and to the emitter of transistor 57 on the other end. When transistor 57 is switched on, the voltage provided by the electrode to which cable 32 is connected is substantially applied across relay coil 65 thereby actuating (closing) contact 61.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed is:

1. A safety booster cable assembly for transmitting electricity from a D.C. source, having electrodes, to a receiving battery, having electrodes, comprising:
    A. first conductor means having two ends connecting one of the electrodes of said D.C. source to an electrode in said receiving battery;
    B. second conductor means having two ends connecting the other electrodes of said source and battery;
    C. gate means for comparing the voltage polarity of the electrodes connected to the ends of said first cable means and having two inputs and one output and so arranged and constructed to provide an output signal if the polarities are the same and another output signal if they are different;
    D. relay means for interrupting the connection between the electrodes connected by said first conductor means and said relay means having a contact that electrically connects the electrodes connected by said first conductor means, and a coil input that is connected to the output of said gate means so that said relay means interrupts said connection with one of said output signals and maintains the connection with the other output signal; and
    E. time delay means connected to the output of said gate means so that the transmission of the output of said gate means to said relay means is delayed by a predetermined time period.

2. The cable assembly set forth in claim 1 wherein said time delay means includes resistor means and capacitor means connected to the output of said gate means so that the resulting output signal is delayed.

3. The cable assembly set forth in claim 2 wherein said time delay means includes a device having an input connected to said capacitor means and said device having an output that is connected to said relay means so that said contact closes when the voltage applied to the input of said device reaches a predetermined level.

4. The cable assembly set forth in claim 3, wherein said device includes a transistor.

5. The cable assembly set forth in claim 4 wherein said device includes a plurality of diodes connected in series with the base-emitter junction of said transistor so that the threshold voltage of said device is increased.

6. The cable assembly set forth in claim 3 wherein said device includes a voltage comparator.

7. The cable assembly set forth in claim 6 wherein said gate means includes an AND gate having two inputs and an output.

8. The cable assembly set forth in claim 7 wherein said relay means includes a polarity protective circuit for said AND gate.

9. The cable assembly set forth in claim 8 wherein said polarity protective circuit includes two back to back diodes connected to the ends of said first cable means and the back to back point provide the supply voltage to said gate means.

10. The cable assembly set forth in claim 3 including a first light emitting diode means connected between the end of said first conductor means connected to one of the electrodes of said D.C. source and the end of said second conductor means connected to the other electrode of said D.C. source and further including a second light emitting diode means connected between the end of said second conductor means connected to one of the electrodes of said receiving source and the end of said second conductor means connected to the other electrode of said receiving source.

* * * * *